United States Patent
Kasai et al.

(10) Patent No.: US 9,759,106 B2
(45) Date of Patent: Sep. 12, 2017

(54) REDUCING AGENT INJECTION DEVICE, EXHAUST GAS TREATMENT DEVICE AND EXHAUST GAS TREATMENT METHOD

(71) Applicant: NGK Insulators, Ltd., Nagoya (JP)

(72) Inventors: Yoshiyuki Kasai, Nagoya (JP); Kazumi Mase, Nagoya (JP); Katsumi Saiki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/856,659

(22) Filed: Sep. 17, 2015

(65) Prior Publication Data

US 2016/0017777 A1 Jan. 21, 2016

Related U.S. Application Data

(63) Continuation of application No. PCT/JP2014/057385, filed on Mar. 18, 2014.

(30) Foreign Application Priority Data

Mar. 22, 2013 (JP) .................. 2013-060923

(51) Int. Cl.
*F01N 3/022* (2006.01)
*F01N 3/20* (2006.01)
(Continued)

(52) U.S. Cl.
CPC ........... *F01N 3/0222* (2013.01); *B01D 53/90* (2013.01); *B01D 53/9431* (2013.01);
(Continued)

(58) Field of Classification Search
CPC ...... F02D 41/029; F01N 9/029; F01N 3/0842; F01N 13/02; F01N 3/035; F01N 3/08; B01J 19/08
(Continued)

(56) References Cited

U.S. PATENT DOCUMENTS 5,245,825 A 9/1993 Ohhashi et al.
6,247,303 B1 * 6/2001 Broer .................. B01D 53/323
60/274
(Continued)

FOREIGN PATENT DOCUMENTS

DE 19510804 A1 * 9/1996 ............. B01D 53/32
DE 10 2005 031 816 A1 1/2007
(Continued)

OTHER PUBLICATIONS

Machine Translation of JP 2005-344597, Translated on Nov. 11, 2016.*
(Continued)

*Primary Examiner* — Patrick Maines
(74) *Attorney, Agent, or Firm* — Burr & Brown, PLLC (57) ABSTRACT

A reducing agent injection device includes a honeycomb structure having a honeycomb structure body and a pair of electrode members arranged in a side surface of the honeycomb structure body and a urea spraying device spraying a urea water solution in mist form. The urea water solution sprayed from the urea spraying device is supplied inside cells from a first end face of the honeycomb structure body, and urea in the urea water solution supplied in the cells is heated and hydrolyzed inside the electrically heated honeycomb structure body to generate ammonia. The ammonia is discharged outside the honeycomb structure body from a second end face and injected outside. There is provided a reducing agent injection device that can generate and inject ammonia from a urea solution with less energy.

17 Claims, 3 Drawing Sheets

(51) Int. Cl.
  *B01D 53/90*   (2006.01)
  *B01D 53/94*   (2006.01)

(52) U.S. Cl.
  CPC .......... *F01N 3/208* (2013.01); *B01D 53/9477* (2013.01); *B01D 2251/2067* (2013.01); *B01D 2255/1021* (2013.01); *B01D 2255/1023* (2013.01); *B01D 2255/1025* (2013.01); *B01D 2255/20723* (2013.01); *B01D 2255/50* (2013.01); *B01D 2257/404* (2013.01); *B01D 2257/406* (2013.01); *B01D 2257/502* (2013.01); *B01D 2257/702* (2013.01); *F01N 2240/16* (2013.01); *F01N 2240/40* (2013.01); *F01N 2330/30* (2013.01); *F01N 2610/02* (2013.01); *F01N 2610/10* (2013.01); *F01N 2610/105* (2013.01); *F01N 2610/146* (2013.01); *F01N 2610/1453* (2013.01); *Y02T 10/24* (2013.01)

(58) Field of Classification Search
  USPC .......... 60/285, 286, 295, 301; 422/235, 212, 422/213.2
  See application file for complete search history.

(56) References Cited

U.S. PATENT DOCUMENTS

| | | | | |
|---|---|---|---|---|
| 2001/0002244 | A1* | 5/2001 | Gieshoff | B01D 53/32 423/235 |
| 2004/0040288 | A1* | 3/2004 | Jacob | B01D 53/8631 60/286 |
| 2008/0112872 | A1 | 5/2008 | Brück | |
| 2008/0155973 | A1* | 7/2008 | Maruyama | F01N 3/2066 60/299 |
| 2008/0175776 | A1 | 7/2008 | Jacob | |
| 2008/0250775 | A1* | 10/2008 | Bruck | B01D 39/2044 60/297 |
| 2009/0226356 | A1 | 9/2009 | Bruck et al. | |
| 2009/0249772 | A1* | 10/2009 | Sato | B01D 53/32 60/297 |
| 2009/0257924 | A1 | 10/2009 | Dismon et al. | |
| 2010/0082222 | A1* | 4/2010 | Alark | F02D 41/221 701/103 |
| 2012/0003420 | A1* | 1/2012 | Betsushiyo | C04B 35/573 428/116 |
| 2013/0036719 | A1 | 2/2013 | Noguchi et al. | |
| 2014/0047821 | A1 | 2/2014 | Kawada et al. | |
| 2014/0150410 | A1* | 6/2014 | Gerhart | C01C 1/08 60/274 |

FOREIGN PATENT DOCUMENTS

| | | | |
|---|---|---|---|
| DE | 10 2005 035 554 | A1 | 2/2007 |
| EP | 0 487 886 | A1 | 6/1992 |
| EP | 0 502 726 | A1 | 9/1992 |
| EP | 2 540 382 | A1 | 1/2013 |
| JP | 04-280086 | A1 | 10/1992 |
| JP | 11-12510 | A1 | 5/1999 |
| JP | 2005-344597 | A1 | 12/2005 |
| JP | 2005344597 | A * | 12/2005 |
| JP | 2007-327377 | A1 | 12/2007 |
| JP | 2008223495 | A * | 9/2008 |
| JP | 2009-524765 | A1 | 7/2009 |
| JP | 2010-506077 | A1 | 2/2010 |
| JP | 2010-229978 | A1 | 10/2010 |
| JP | 2011-078899 | A1 | 4/2011 |
| JP | 2012-030215 | A1 | 2/2012 |
| JP | 2012-197695 | A1 | 10/2012 |
| JP | 2012-225284 | A1 | 11/2012 |
| JP | 2012-233443 | A1 | 11/2012 |
| JP | 2012233443 | A * | 11/2012 |
| JP | EP 2540382 | A1 * | 1/2013 .......... C04B 35/565 |

OTHER PUBLICATIONS

International Search Report and Written Opinion (Application No. PCT/JP2014/057385) dated Jun. 17, 2014.
Extended European Search Report (Application No. 14770812.7) dated Oct. 19, 2016.
Japanese Office Action (Application No. 2015-506806) dated Jul. 4, 2017 (with English translation).

\* cited by examiner

REDUCING AGENT INJECTION DEVICE, EXHAUST GAS TREATMENT DEVICE AND EXHAUST GAS TREATMENT METHOD

BACKGROUND OF THE INVENTION

Field of the Invention

The present invention relates to a reducing agent injection device, an exhaust gas treatment device, and an exhaust gas treatment method. More specifically, the present invention relates to the reducing agent injection device that can generate and inject ammonia from a urea solution with less energy. Further, the present invention relates to the exhaust gas treatment device that includes this reducing agent injection device, and that can treat $NO_x$ in an exhaust gas with less energy even when the exhaust gas is at low temperature. Furthermore, the present invention relates to the exhaust gas treatment method that can treat $NO_x$ in the exhaust gas with less energy by use of this exhaust gas treatment device, even when the exhaust gas is at low temperature.

Description of Related Art

Conventionally, a selective catalytic reduction type $NO_x$ catalyst (an SCR catalyst) has been used to purify nitrogen oxides ($NO_x$) in the exhaust gas discharged from various kinds of engines and the like (for example, see Patent Documents 1 to 3).

The exhaust gas purifying device disclosed in Patent Document 1 has a catalyst (an SCR catalyst) mounted on an exhaust pipe of an engine and means for injecting a urea water into the exhaust pipe between the engine and the catalyst. Further, in the exhaust gas purifying device, a plurality of urea water injection means, which mixes the urea water and the exhaust gas, and mixes the urea water with the exhaust gas while causing the urea water to react with a specific component in the exhaust gas by the catalyst, are provided in a plurality of places.

The device disclosed in Patent Document 2 is the device for reducing nitrogen oxides in the exhaust gas in an internal combustion engine. Further, the device includes a thermal decomposition reactor to generate ammonia from a solid urea, a heating device, and an SCR catalyst, and cause the ammonia generated from the solid urea to flow in the SCR catalyst.

The device disclosed in Patent Document 3 is the device for evaporating at least one of a reducing agent precursor (urea) solution and a reducing agent precursor (urea). The evaporated substance (urea) is to undergo hydrolysis by a hydrolysis catalytic converter arranged on a downstream side. This device includes a heating zone and a heating element arranged in the heating zone, and evaporates at least one of the reducing agent precursor solution and the reducing agent precursor by the heating element. The hydrolyzed substance (ammonia) by the hydrolysis catalytic converter is used for a reduction treatment in the SCR catalytic converter.

CITATION LIST

Patent Documents

[Patent Document 1] JP-A-2007-327377
[Patent Document 2] JP-T-2009-524765
[Patent Document 3] JP-A-2010-506077

SUMMARY OF THE INVENTION

Problem to be Solved by the Invention

Because the exhaust gas purifying device disclosed in Patent Document 1 decomposes the urea water by heat of the exhaust gas, there has been a problem that urea is less likely to react when the temperature of the exhaust gas lowers due to improvement of fuel consumption of the engine and the like.

Though the device disclosed in Patent Document 2 uses a solid urea, there is the problem that it is difficult to convey the solid urea to a reaction device and conveyance becomes further difficult due to absorption of moisture unless moisture is completely cut off during storage.

In the device disclosed in Patent Document 3, the heating element does not have an appropriate shape to evaporate at least one of the reducing agent precursor solution and reducing agent precursor with less energy, and thus there has been a problem that thermal decomposition is less likely to occur with less energy.

The present invention has been developed in view of such problems of the conventional techniques. The present invention provides a reducing agent injection device that can generate and inject ammonia (reducing agent) from a urea solution with less energy. The present invention provides an exhaust gas treatment device that includes this reducing agent injection device and that can treat $NO_x$ in exhaust gas with less energy even when the exhaust gas is at low temperature. The present invention provides an exhaust gas treatment method that can treat $NO_x$ in the exhaust gas with less energy by using this exhaust gas treatment device, even when the exhaust gas is at low temperature.

Means for Solving the Problem

The present invention provides the following reducing agent injection device, exhaust gas treatment device, and exhaust gas treatment method.

According to a first aspect of the present invention, a reducing agent injection device is provided, including: a honeycomb structure that has a honeycomb structure body with a pillar shape having a partition wall defining and forming a plurality of cells which are through channels of a fluid and extend from a first end face being an end face on an inflow side of the fluid to a second end face being an end face on an outflow side of the fluid, and that has a pair of electrode members arranged in a side surface of the honeycomb structure body; and a urea spraying device that sprays a urea water solution in mist form, wherein each of the pair of electrode members is formed in a band shape extending to a cell extending direction of the honeycomb structure body, and one electrode member of the pair of electrode members is arranged on an opposite side of the other electrode member of the pair of electrode members with respect to a center of the honeycomb structure body sandwiched by the pair of electrode members, in a cross section perpendicular to the cell extending direction, and the urea water solution sprayed from the urea spraying device is supplied inside the cells from the first end face of the honeycomb structure body, and urea in the urea water solution supplied in the cells is heated and hydrolyzed inside the electrically heated honeycomb structure body to generate ammonia, and the ammonia is discharged outside the honeycomb structure body from the second end face and is injected outside.

According to a second aspect of the present invention, the reducing agent injection device according to the first aspect is provided, wherein a urea spraying space is formed between the first end face of the honeycomb structure body and the urea spraying device.

According to a third aspect of the present invention, the reducing agent injection device according the first or second aspects is provided, wherein an electrical resistivity of the honeycomb structure body is 0.01 Ωcm to 500 Ωcm.

According to a fourth aspect of the present invention, the reducing agent injection device according to any one of the first to third aspects is provided, wherein the honeycomb structure body contains a silicon-silicon carbide composite material or silicon carbide as a main component.

According to a fifth aspect of the present invention, the reducing agent injection device according to any one of the first to fourth aspects is provided, wherein a urea hydrolysis catalyst is loaded onto the honeycomb structure.

According to a sixth aspect of the present invention, the reducing agent injection device according to any one of the first to fifth aspects is provided, wherein the urea water solution is sprayed toward the first end face of the honeycomb structure body from the urea spraying device and an angle between a spraying direction of the urea water solution from the urea spraying device and a direction parallel to the cell extending direction of the honeycomb structure body and heading to the first end face of the honeycomb structure body from the urea spraying device is from 5° to 60°.

According to a seventh aspect of the present invention, the reducing agent injection device according to any one of the first to sixth aspects is provided, wherein a surface area per unit volume of the honeycomb structure body is equal to or more than 5 $cm^2/cm^3$.

According to an eighth aspect of the present invention, the reducing agent injection device according to any one of the first to seventh aspects is provided, wherein the honeycomb structure body has a plugging portion at an end portion of the first end face side in a part of the cells thereof.

According to a ninth aspect of the present invention, the reducing agent injection device according to any one of the first to eighth aspects is provided, wherein the urea spraying device is a solenoid type, a piezoelectric actuator type, an ultrasonic type, or an atomizer type.

According to a tenth aspect of the present invention, an exhaust gas treatment device is provided, including: an exhaust pipe that flows an exhaust gas containing $NO_x$; the reducing agent injection device according to any one of the first to ninth aspects is provided, that injects ammonia inside the exhaust pipe; and an SCR catalyst arranged on a downstream side of the exhaust pipe with respect to a position where the ammonia is injected.

According to an eleventh aspect of the present invention, an exhaust gas treatment method is provided, including flowing the exhaust gas containing $NO_x$ in the exhaust pipe, injecting ammonia in the exhaust gas, and performing a reduction treatment to the exhaust gas mixed with the ammonia by the SCR catalyst, by using the exhaust gas treatment device according to the tenth aspect of the present invention.

According to a twelfth aspect of the present invention, the exhaust gas treatment method according to the eleventh aspect is provided, wherein temperature of the honeycomb structure is equal to or more than 160° C.

According to a thirteenth aspect of the present invention, the exhaust gas treatment method according to the eleventh or twelfth aspects is provided, including intermittently performing, under temperature of the honeycomb structure equal to or more than 360° C., a reducing agent injection device cleaning operation which removes a sulfur compound adhered to the reducing agent injection device.

According to a fourteenth aspect of the present invention, the exhaust gas treatment method according to any one of the eleventh to thirteenth aspects is provided, calculating temperature of the honeycomb structure body from a resistance value of the honeycomb structure body, and controlling the temperature of the honeycomb structure body such that the calculated temperature becomes desired temperature.

Effect of the Invention

According to the reducing agent injection device of the present invention, the urea water solution sprayed by the urea spraying device is supplied inside the cell of the honeycomb structure. Then, the urea in the urea water solution is heated and hydrolyzed inside the electrically heated honeycomb structure to generate ammonia. Then, the generated ammonia is injected outside. Because "the honeycomb structure has a larger surface area and a smaller pressure loss," the ammonia can be generated from the urea solution with less energy.

According to the exhaust gas treatment device of the present invention, because the exhaust gas treatment device of the above-described present invention is included, the ammonia can be generated from the urea water solution with less energy even when the exhaust gas is at low temperature. Then, $NO_x$ in the exhaust gas can be treated with less energy.

According to the exhaust gas treatment method of the present invention, because the exhaust gas is treated by use of the exhaust gas treatment device of the above-described present invention, $NO_x$ in the exhaust gas can be treated with less energy even when the exhaust gas is at low temperature.

DETAILED DESCRIPTION OF THE INVENTION

The following specifically describes a mode for carrying out the present invention. It should be understood that the present invention is not limited to the following embodiments and that design change, improvement, and the like may be suitably added on the basis of ordinary knowledge of a person skilled in the art without departing from the gist of the present invention.

Figure 1:
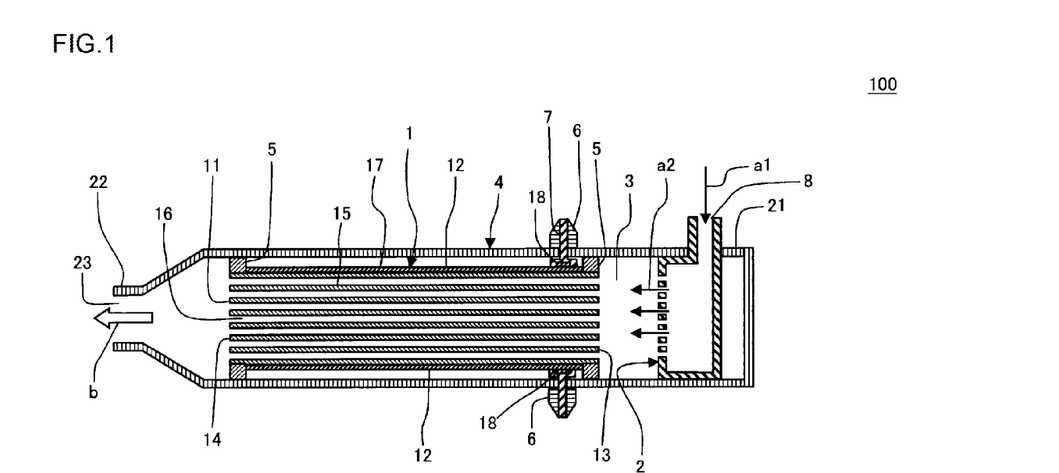
FIG. 1 is a schematic diagram showing a cross section of one embodiment of a reducing agent injection device of the present invention.

(1) Reducing Agent Injection Device:

As shown in FIG. 1, one embodiment of a reducing agent injection device 100 includes a honeycomb structure 1 and a urea spraying device 2 spraying a urea water solution in mist form. The honeycomb structure 1 has a pillar-shaped honeycomb structure body 11 and a pair of electrode members 12 and 12 arranged in a side surface of the honeycomb structure body 11. The honeycomb structure body 11 has "'partition walls 15 defining and forming" a plurality of cells 16 which are through channels of a fluid and extend from a first end face 13 being an end face on an inflow side of the fluid to a second end face 14 being an end face on an outflow side of the fluid.'" Each of the pair of electrode members 12 and 12 is formed in a band shape extending in cells 16 extending direction of the honeycomb structure body 11. In a cross section perpendicular to the cells 16 extending direction, one electrode member 12 of the pair of electrode members 12 and 12 is arranged on an opposite side of the other electrode member 12 of the pair of electrode members 12 and 12 sandwiching a center of the honeycomb structure body 11. In the reducing agent injection device 100 of the embodiment, a urea water solution a2 sprayed from the urea spraying device 2 is supplied inside the cell 16 from the first end face 13 of the honeycomb structure body 11. Then, urea in the urea water solution supplied inside the cell 16 is heated and hydrolyzed inside the electrically heated honeycomb structure body 11 to generate ammonia (reducing agent). Then, an ammonia b is discharged outside the honeycomb structure body 11 from the second end face 14, and this ammonia b is injected outside. FIG. 1 is a schematic diagram showing a cross section (a cross section parallel to the cell 16 extending direction of the honeycomb structure body 11) of the one embodiment of the reducing agent injection device 100 of the present invention.

In consequence, according to the reducing agent injection device 100 of the embodiment, the urea water solution a2 sprayed from the urea spraying device 2 is supplied inside the cell 16 of the honeycomb structure 1. Then, the urea in the urea water solution is heated and hydrolyzed inside the electrically heated honeycomb structure 1 to generate ammonia. Then, the generated ammonia b is injected outside. Because the honeycomb structure 1 has a larger surface area and a smaller pressure loss, the ammonia can be generated from a urea solution with less energy. In the reducing agent injection device 100 of the embodiment, a raw material for generation of the ammonia is the urea water solution. Therefore, a urea water solution distributed on the market (for example, AdBlue (a urea water solution of 32.5 mass %: a registered trademark of the German Automotive Industry Association (VDA)) is available. Accordingly, it is highly convenient in terms of procurement of a urea water solution as a raw material for generation of ammonia.

Here, a case that the urea water solution is heated by the honeycomb structure and another case that the urea water solution is heated by a nichrome wire are compared below. For example, when the honeycomb structure with a partition wall thickness of 0.1524 mm and a cell density of 62 cells/cm$^2$ is used, the surface area per 1 cm$^3$ becomes approximately 27.73 cm$^2$. When attempting to make the surface area to be 27.73 cm$^2$ by use of the nichrome wire with a diameter of, for example, 0.5 mm, the nichrome wire with a length of 1.76 m is necessary. It is difficult to house the nichrome wire of this length in 1 cm$^3$ while "a passage, such as the cell of the honeycomb structure, where the urea water solution flows" is ensured. When the urea water solution is heated, a heat transfer area and temperature of a heating member (the honeycomb structure, a nichrome wire and the like) become dominant factors. Therefore, during heating a predetermined amount of the urea water solution, when the area of this heating member is smaller, higher temperature is necessary, and thus higher energy becomes necessary. As described above, the method of electrical heating by use of the honeycomb structure, compared to the method in which a linear heating member such as a nichrome wire is used, can heat the urea water solution with less energy and generate ammonia with less energy.

Figure 3:
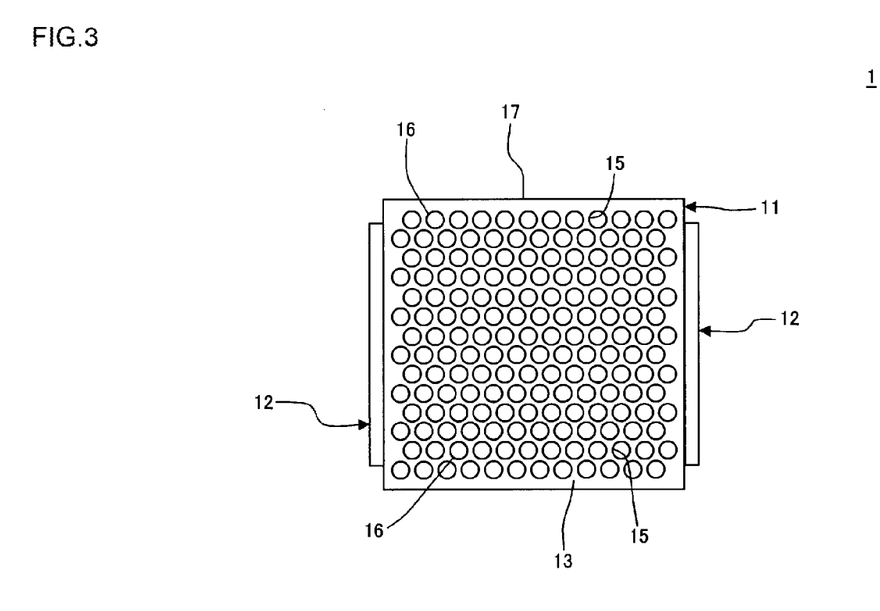
FIG. 3 is a plan view schematically showing an end face of a honeycomb structure constituting of the one embodiment of the reducing agent injection device of the present invention.

In the reducing agent injection device 100 of the embodiment, the honeycomb structure 1 and the urea spraying device 2 are housed inside a tubular outer cylinder 4. The honeycomb structure 1 is secured inside the outer cylinder 4 by an insulation supporting portion 5. As shown in FIG. 3, in the honeycomb structure 1, a shape of the first end face 13 of the honeycomb structure body 11 is preferably a square shape. The shape of the first end face 13 is not limited to a square shape, and may be a rectangular shape, other polygonal shape, a circular shape, an oval shape and the like. The shape of the first end face 13 is the same as that of the second end face 14, and further preferably also the same as that of a cross section, which is perpendicular to the cell 16 extending direction of the honeycomb structure body 11. The shape (the shape of the outer cylinder) of "the cross section perpendicular to a direction heading from an inlet side end portion 21 to an outlet side end portion 22," of the outer cylinder 4 is preferably a similar shape to "the shape (the shape of the honeycomb structure body) of the cross section perpendicular to the cell 16 extending direction" of the honeycomb structure body 11. Here, "the similar shape" means that when "the shape of the outer cylinder" is a square shape, "the shape of the honeycomb structure body" is the square shape, and when "the shape of the outer cylinder" is a rectangular shape, "the shape of the honeycomb structure body" is the rectangular shape. Here, for example, when "the shape of the outer cylinder" and "the shape of the honeycomb structure body" are "the similar shape", and the shapes are the rectangular shapes, even ratios between longitudinal lengths and lateral lengths are not necessary to be the same. The size of "the cross section perpendicular to the cell 16 extending direction," of the honeycomb structure body 11 is smaller than that of "the cross section perpendicular to a central axis," of the outer cylinder 4.

A urea spraying space 3 is preferably formed between the first end face 13 of the honeycomb structure body 11 and the urea spraying device 2. Further, "the urea spraying space 3 between the first end face 13 of the honeycomb structure body 11 and the urea spraying device 2" is preferably formed inside the outer cylinder 4. The urea spraying space 3 is a space formed by the first end face 13 of the honeycomb structure body 11, the urea spraying device 2, and the outer cylinder 4. A substance (droplets in mist form, gas and the like) inside the urea spraying space 3 cannot move outside except when "it flows inside the honeycomb structure body 11 from the first end face 13 of the honeycomb structure body 11 and then is discharged outside." Each wall of the first end face 13 of the honeycomb structure body 11, the urea spraying device 2, and the outer cylinder 4, which form the urea spraying space 3, has pressure resistance able to endure a pressurized state when ammonia is generated by heating (hydrolysis of the urea). In the reducing agent injection device 100 of the embodiment, when the urea spraying space 3 is formed, the urea water solution a2 sprayed from the urea spraying device 2 is supplied inside the cell 16 from the first end face 13 of the honeycomb structure body 11 through the urea spraying space 3.

In the urea spraying space 3, the urea water solution sprayed from the urea spraying device 2 evaporates by contact with "the first end face 13 of the electrically heated honeycomb structure body 11 and its proximity" and raises pressure. When ammonia is generated by the urea in the urea water solution hydrolyzed inside the honeycomb structure 1, this pressure rise becomes a propulsive force to inject the generated ammonia outside from an injection port 23.

A distance between the inlet side end portion 21 and the urea spraying device 2 is preferably from 5 mm to 50 mm. When the distance is closer than 5 mm, it is likely to cause an operation failure due to a high temperature of the urea spraying device. When the distance is longer than 50 mm, an operating time from the injection of the urea to introduction of ammonia into an exhaust pipe may be longer.

The outer cylinder 4 has a tubular shape having the inlet side end portion 21 as one end portion and the outlet side end portion 22 as the other end portion. At a distal end of the outlet side end portion 22, the injection port 23 as an open end for injection of the ammonia is formed. Inside the inlet side end portion 21 of the outer cylinder 4, the urea spraying device 2 is mounted. In the inlet side end portion 21 of the outer cylinder 4, there is not formed any open end except a portion where the urea spraying device 2 is inserted. A material of the outer cylinder 4 is preferably stainless steel and the like.

The honeycomb structure 1 is secured (held) inside the outer cylinder 4 by the insulation supporting portion 5. This ensures insulation between the honeycomb structure 1 and the outer cylinder 4. A material of the insulation supporting portion 5 is preferably alumina. There may be a portion (space), where the insulation supporting portion 5 is not arranged, between the honeycomb structure 1 and the outer cylinder 4. The whole outer circumference of the honeycomb structure 1 may be covered by the insulation supporting portion 5 (in this case, an insulating member is not arranged).

The reducing agent injection device 100 of the embodiment is configured such that the ammonia discharged from the second end face 14 of the honeycomb structure 1 is injected from the injection port 23 through the inside of the outlet side end portion 22 of the outer cylinder 4. In the reducing agent injection device of the present invention, the second end face 14 of the honeycomb structure 1 may be arranged on the same surface as a surface on which an open end portion of the injection port 23 of the outer cylinder 4 is positioned. In this case, the ammonia discharged from the second end face 14 of the honeycomb structure 1 comes to be discharged from the injection port 23 of the outer cylinder 4 simultaneously with the discharge from the second end face 14.

Figure 2:
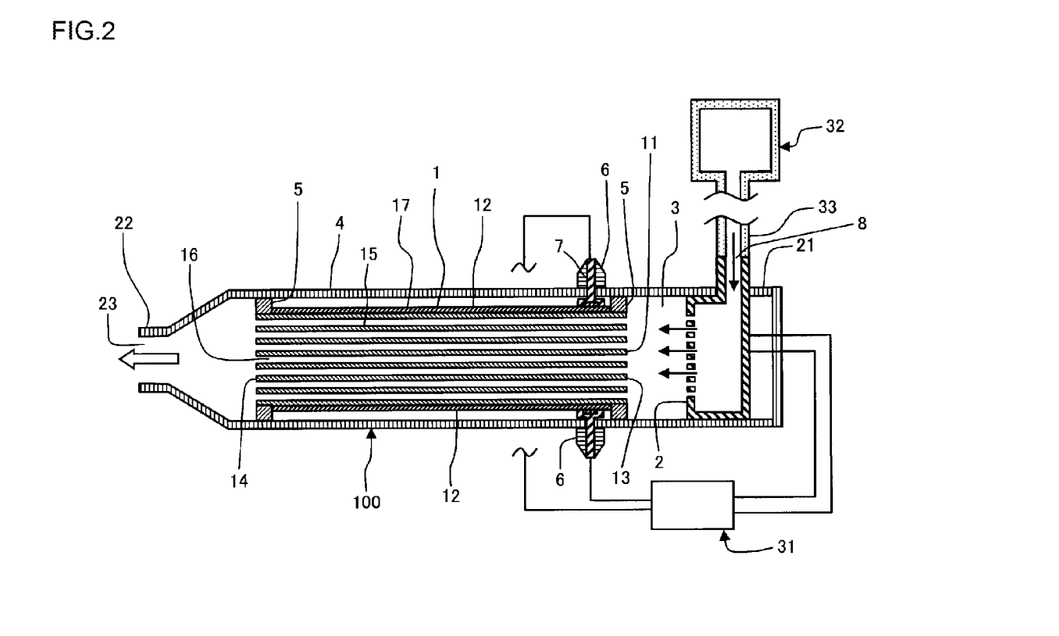
FIG. 2 is a schematic diagram showing a cross section of an ammonia injection system using the one embodiment of the reducing agent injection device of the present invention.

As shown in FIG. 2, the reducing agent injection device 100 of the embodiment preferably performs controls of electrical heating of the honeycomb structure 1 and spraying of the urea water solution, by an electronic control device 31. The electronic control device 31 is preferably connected to a power source (not shown). Voltages of the power source are preferably from 12 V to 200 V. The urea water solution is preferably supplied to the reducing agent injection device 100 from a urea water solution reservoir 32. The urea water solution reservoir 32 and a urea water solution inlet 8 of the reducing agent injection device 100 are preferably connected by a pipe 33 where the urea water solution passes. Further, the pipe 33 preferably has a heating function (not shown) in order to be able to heat the urea water solution. The heating function of the pipe 33 includes a structure for circulation of a heating medium in a jacket, an electric heating device and the like. In the outer cylinder 4, two connectors 6 for connection with wiring from the electronic control device 31 (power source) are preferably arranged.

The following further describes the reducing agent injection device 100 of the embodiment by respective constituent components.

(1-1) Honeycomb Structure;

In the reducing agent injection device 100 of the embodiment, as described above, the honeycomb structure 1 includes the honeycomb structure body 11 and the pair of electrodes 12 and 12.

In the honeycomb structure body 11, an outer circumferential wall 17 is arranged outside the partition wall 15. In the honeycomb structure body 11, the materials of the partition wall 15 and the outer circumferential wall 17 are preferably ceramic. Especially, the materials of the partition wall 15 and the outer circumferential wall 17 preferably contain a "silicon-silicon carbide composite material", "silicon carbide" and the like as a main component. Among these, the material containing the "silicon-silicon carbide composite material" is further preferable as the main component. By using such materials, it becomes easier to adjust electrical resistivity of the honeycomb structure body to any value by change of a ratio between silicon carbide and silicon. Here, the silicon-silicon carbide composite material contains silicon carbide particles as aggregates and metal silicon as a bonding material combining the silicon carbide particles. In the silicon-silicon carbide composite material, a plurality of silicon carbide particles are preferably bonded by the metal silicon. The above-described "silicon carbide" is formed by the silicon carbide particles sintered together. In this description, the "main component" means the component occupying equal to or more than 90 mass %.

The electrical resistivity of the honeycomb structure body 11 is preferably from 0.01 Ωcm to 500 Ωcm, and is further preferably from 0.1 Ωcm to 200 Ωcm. This allows causing the honeycomb structure (honeycomb structure body) to effectively generate heat by application of voltage to the pair of electrode members 12 and 12. Especially, the above-described electrical resistivity preferably causes the honeycomb structure 1 (honeycomb structure body 11) to generate heat in a range of 160° C. to 600° C. by use of a power source with voltages of 12 V to 200 V. The electrical resistivity of the honeycomb structure body is a value at 25° C. The electrical resistivity of the honeycomb structure body is the value measured by a four-terminal method.

In the honeycomb structure body 11, the surface area per unit volume is preferably equal to or more than 5 $cm^2/cm^3$, and is further preferably from 8 $cm^2/cm^3$ to 45 $cm^2/cm^3$, and is especially preferably from 20 $cm^2/cm^3$ to 40 $cm^2/cm^3$. When the surface area per unit volume is smaller than 5 $cm^2/cm^3$, a contact area with the urea water solution becomes smaller, so that a treatment rate of the urea water solution, namely a generation amount (generation rate) of ammonia may decrease. The surface area of the honeycomb structure body is the area of the surface of the partition wall of the honeycomb structure body.

In the honeycomb structure 1 (honeycomb structure body 11), a thickness of the partition wall 15 is preferably from 0.06 mm to 1.5 mm, and is further preferably from 0.10 mm to 0.80 mm. When the thickness of the partition wall 15 is thicker than 1.5 mm, the pressure loss becomes larger, and the treatment rate of the urea water solution, namely the generation amount (generation rate) of ammonia may decrease. When the thickness of the partition wall 15 is thinner than 0.06 mm, it may be broken by thermal shock by energization. When the shape of the cell 16 (the shape perpendicular to the cell extending direction) is a circular shape, the thickness of the partition wall means the thickness of the partition wall for "a portion where the distance between the cells is shortest (the portion where the partition wall is thinnest)." The cell density is preferably from 7 cells/cm$^2$ to 140 cells/cm$^2$, and further preferably from 15 cells/cm$^2$ to 120 cells/cm$^2$. When the cell density is smaller than 7 cells/cm$^2$, the contact area with the urea water solution becomes smaller, so that the treatment rate of the urea water solution, namely the generation amount (generation rate) of the ammonia may decrease. When the cell density is larger than 140 cells/cm$^2$, the pressure loss becomes larger, and the treatment rate of the urea water solution, namely the generation amount (generation rate) of ammonia may decrease.

Figure 4:
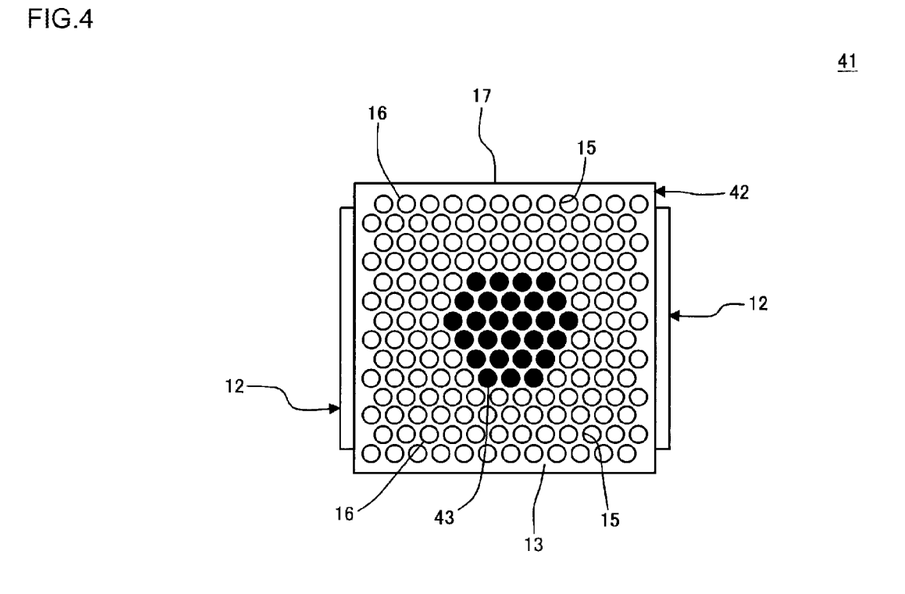
FIG. 4 is a plan view schematically showing the end face of the honeycomb structure constituting of other embodiment of the reducing agent injection device of the present invention.

As shown in FIG. 4, the reducing agent injection device of the present invention preferably has a plugging portion 43 in "an end portion on the first end face 13 side of each of a part of the cells 16 of the honeycomb structure body 42". FIG. 4 is a plan view schematically showing the end face (the first end face 13) of a honeycomb structure 41 constituting another embodiment of the reducing agent injection device of the present invention. The material of the plugging portion 43 is preferably the same as the material of the partition wall, and may be other material.

As to the size of the honeycomb structure 1, the area of the first end face 13 (the second end face 14) is preferably from 50 mm$^2$ to 10000 mm$^2$, and is further preferably 100 mm$^2$ to 8000 mm$^2$.

In the honeycomb structure 1, the shape of the cells 16 in the cross section perpendicular to the cell 16 extending direction is preferably a circular shape, an oval shape, a quadrilateral shape, a hexagonal shape, an octagonal shape, or a combination of these shapes. Forming the shape of the cell in this way decreases the pressure loss when flowing the exhaust gas in the honeycomb structure and makes it possible to efficiently hydrolyze the urea. In the honeycomb structure 1 shown in FIG. 3, the shape of the cells 16 in the cross section (the first end face) perpendicular to the cell 16 extending direction is the circular shape.

Each of the pair of electrode members 12 and 12 is formed in a band shape extending in the cell 16 extending direction of the honeycomb structure body 11. Further, the electrode member 12 is preferably formed in a wider width expanding also in a circumferential direction of the honeycomb structure body 11. In the cross section perpendicular to the cell 16 extending direction, one electrode member 12 of the pair of electrode members 12 and 12 is arranged in the opposite side with respect to the other electrode member 12 of the pair of electrode members 12 and 12 with a center of the honeycomb structure body 11 sandwiched by the pair of electrode members 12 and 12. This can reduce variations of a current flowing inside the honeycomb structure body 11 when a voltage is applied between the pair of electrode members 12 and 12. Then, this can reduce variations of heat generation inside the honeycomb structure body 11.

In the honeycomb structure 1, the main component of the electrode member 12 is preferably the same as the main component of the partition walls 15 and the outer circumferential wall 17. The material of the electrode member 12 is further preferably the material where the electrical resistivity is adjusted to a desired value.

The electrical resistivity of the electrode member 12 is preferably from 0.0001 Ωcm to 100 Ωcm, and further preferably from 0.001 Ωcm to 50 Ωcm. By setting a range of the electrical resistivity of the electrode member 12 as just described, the pair of electrode members 12 and 12 effectively performs a function as electrodes inside the pipe where the high temperature exhaust gas flows. In the honeycomb structure 1, the electrical resistivity of the electrode member 12 is preferably lower than the electrical resistivity of the honeycomb structure body 11. The electrical resistivity of the electrode member is the value at 400° C. The electrical resistivity of the electrode member is the value measured by a four-terminal method.

A porosity and an average pore diameter of the electrode member 12 can be appropriately determined so as to obtain a desired electrical resistivity corresponding to an application.

In each of the electrode members 12 and 12, an electrode terminal projecting portion 18 for connection with the electrical wiring from outside may be arranged, respectively. The material of the electrode terminal projecting portion 18 may be a conductive ceramic material or metal. The material of the electrode terminal projecting portion 18 is preferably the same as that of the electrode member 12. The electrode terminal projecting portion 18 and the connector 6 of the outer cylinder 4 are preferably connected by an electrical wiring 7.

In the reducing agent injection device 100 of the embodiment, a urea hydrolysis catalyst is preferably loaded onto the honeycomb structure 1. This efficiently generates the ammonia from the urea. As the urea hydrolysis catalyst, an aluminum oxide and the like can be included.

(1-2) Urea Spraying Device;

The urea spraying device 2 is preferably a solenoid type, an ultrasonic type, a piezoelectric actuator type, or an atomizer type, and is further preferably the solenoid type, the ultrasonic type, or the piezoelectric actuator type. By using these types, the urea water solution can be sprayed in mist form. Among these types, use of the solenoid type, the ultrasonic type, or the piezoelectric actuator type makes it possible to spray the urea water solution in mist form without use of air. Accordingly, the honeycomb structure does not need to heat even the air used for the urea injection and can reduce an energy amount for heating. A reduction of an injection volume due to no injection air allows decreasing a speed at which "the urea water solution in mist form" passes through the honeycomb structure, and thus this ensures having a longer reaction time necessary for hydrolysis. A size (diameter) of droplets of the urea water solution sprayed from the urea spraying device is preferably equal to or less than 0.3 mm. When the size of droplets is larger than 0.3 mm, the droplets may be less likely to evaporate when they received heat from the honeycomb structure 1.

The urea water solution inlet 8 is preferably formed for introduction of the urea water solution inside the urea spraying device 2.

A urea spraying device of a solenoid type is a device that sprays urea water solution in mist form by "vibration of a solenoid" or "forward and backward movement of a piston due to an electric field when a solenoid is used".

A urea spraying device of an ultrasonic type is a device that sprays urea water solution in mist form by an ultrasonic vibration.

A urea spraying device of a piezoelectric actuator type is a device that sprays urea water solution in mist form by a vibration of a piezoelectric element.

A urea spraying device of an atomizer type is, for example, a device that, while drawing up a fluid by a tube, blows off "the fluid drawn up in an open end at a distal end of this tube" in mist form by air, and sprays this fluid. A urea spraying device of an atomizer type may be even a device that sprays a fluid in mist form from a plurality of small open ends formed at a distal end of a nozzle of the device.

Figure 5:
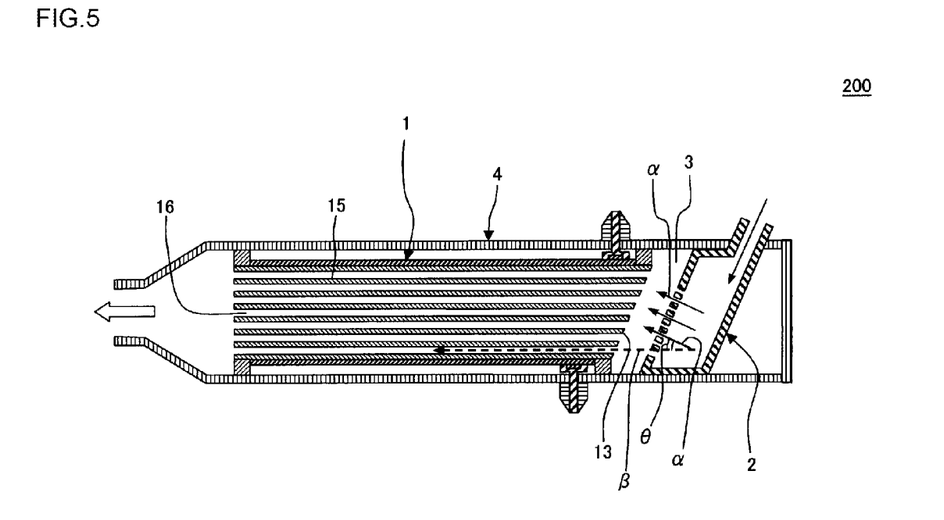
FIG. 5 is a schematic diagram showing a cross section of a yet another embodiment of the reducing agent injection device of the present invention.

In the reducing agent injection device of the embodiment, the urea water solution is preferably sprayed toward the first end face 13 of the honeycomb structure body 11 from the urea spraying device 2. That is, in the urea spraying device 2, a spraying direction (ejected direction of droplets) of the urea water solution preferably faces to the first end face 13 of the honeycomb structure body 11. Here, "the spraying direction of the urea water solution from the urea spraying device" is referred by "a spraying direction $\alpha$ (see FIG. 5)" and "a direction where the ammonia passes through the inside of the cell in the honeycomb structure body" is referred by "a cell direction $\beta$ (see FIG. 5)." Then, an angle $\theta$ (see FIG. 5) between "the spraying direction $\alpha$" and "the cell direction $\beta$" is preferably equal to or less than 60°, and is further preferably from 5° to 60°, and especially preferably from 30° to 50°. The above-described angle $\theta$ equal to or less than 60° can efficiently introduce the urea water solution inside the cells 16 from the first end face 13 of the honeycomb structure body 11. Furthermore, the above-described angle $\theta$ from 5° to 60° allows the urea water solution sprayed from the urea spraying device 2 entering inside the cells 16 from the first end face 13 of the honeycomb structure body 11 and easily colliding to the surface of the partition walls 15. This allows the urea water solution to easily contact to the partition walls 15 and thus allows the partition walls 15 to efficiently heat the urea water solution. FIG. 5 is a schematic diagram showing a cross section of further another embodiment (a reducing agent injection device 200) of the reducing agent injection device of the present invention.

In the reducing agent injection device 200 shown in FIG. 5, the first end face 13 of the honeycomb structure body 11 is formed oblique with respect to the cell direction $\beta$ so as to be perpendicular to the spraying direction $\alpha$. This allows the urea water solution sprayed from the urea spraying device 2 to contact with the partition wall inside the cell more easily.

(2) Manufacturing Method of Reducing Agent Injection Device:

(2-1) Manufacturing of Honeycomb Structure;

When the honeycomb structure is made of ceramic, the manufacturing method of the honeycomb structure is preferably the manufacturing method described as follows. The manufacturing method of the honeycomb structure preferably includes a honeycomb formed body forming process, a dried honeycomb body forming process, an unfired electrode provided honeycomb body forming process, and a honeycomb structure forming process. The honeycomb formed body forming process is preferably the process to form the honeycomb formed body having partition walls defining and forming "a plurality of cells which are through channels of a fluid and extend from one end face to the other end face", by extrusion of forming raw material. The forming raw material preferably contains a ceramic raw material and an organic binder. The dried honeycomb body forming process is preferably the process to form the dried honeycomb body by drying the honeycomb formed body. The unfired electrode provided honeycomb body forming process is preferably the process to form the unfired electrode provided honeycomb body by forming the unfired electrode by applying slurry for electrode formation containing a ceramic raw material and water over a side surface of the dried honeycomb body and drying it. The honeycomb structure forming process is preferably the process to form the honeycomb structure by firing of the unfired electrode provided honeycomb body.

(2-1-1) Honeycomb Formed Body Forming Process:

In the honeycomb formed body forming process, the honeycomb formed body is preferably formed by extrusion of the forming raw material. The forming raw material is preferably a raw material containing a ceramic raw material and an organic binder. In the forming raw material, a surfactant, a sintering additive, a pore former, water and the like besides a ceramic raw material and an organic binder are preferably contained. The forming raw material can be prepared by mixture of these raw materials.

The ceramic raw material in the forming raw material is "ceramic" or "a raw material which becomes ceramic by firing." The ceramic raw material becomes ceramic after firing in both cases. The ceramic raw material in the forming raw material preferably contains metal silicon and silicon carbide particles (silicon carbide powder) as main components or silicon carbide particles (silicon carbide powder) as a main component. Accordingly, the obtained honeycomb structure exhibits electrical conductivity. Metal silicon is also preferably metal silicon particles (metal silicon powder). "Containing metal silicon and the silicon carbide particles as main components" means that a total mass of the metal silicon and silicon carbide particles is equal to or more than 90 mass % of the whole material (ceramic raw material). As components contained in the ceramic raw material other than main component, $SiO_2$, $SrCO_3$, $Al_2O_3$, $MgCO_3$, cordierite and the like can be included.

When silicon carbide is used as the main component of the ceramic raw material, the silicon carbide is sintered by firing. When metal silicon and silicon carbide particles are used as the main component of the ceramic raw material, the silicon carbide as aggregates can be bonded together by firing with metal silicon used as a bonding material.

When silicon carbide particles (silicon carbide powder) and metal silicon particles (metal silicon powder) are used as the ceramic raw material, the mass of the metal silicon particles is preferably from 10 mass % to 40 mass % with respect to the total of the mass of the silicon carbide particles and the mass of the metal silicon particles. An average particle diameter of the silicon carbide particles is preferably from 10 μm to 50 μm, and further preferably from 15 μm to 35 μm. The average particle diameter of the metal silicon particles is preferably from 0.1 μm to 20 μm, and further preferably from 1 μm to 10 μm. The average particle diameters of the silicon carbide particles and metal silicon particles are values measured by a laser diffraction method.

As the organic binder, methyl cellulose, glycerin, hydroxypropyl methyl cellulose and the like can be included. As the organic binder, one kind of organic binder may be used, and plural kinds of organic binder may be used. A content of the organic binder is preferably from 5 parts by mass to 10 parts by mass when the total mass of the ceramic raw material is 100 parts by mass.

As the surfactant, ethylene glycol, dextrin and the like can be used. As the surfactant, one kind of surfactant may be used, and plural kinds of surfactant may be used. The content of the surfactant is preferably from 0.1 parts by mass to 2.0 parts by mass when the total mass of the ceramic raw material is 100 parts by mass.

As the sintering additive, $SiO_2$, $SrCO_3$, $Al_2O_3$, $MgCO_3$, cordierite and the like can be used. As the sintering additive, one kind of sintering additive may be used, and plural kinds of sintering additive may be used. The content of the sintering additive is preferably from 0.1 parts by mass to 3 parts by mass when the total mass of the ceramic raw material is 100 parts by mass.

The pore former is not especially limited as long as it forms pores after firing, and, for example, graphite, starch, a foamable resin, a water absorbable resin, silica gel and the like are included as the pore former. As pore former, one kind of pore former may be used, and plural kinds of pore former may be used. The content of the pore former is preferably from 0.5 parts by mass to 10 parts by mass when the total mass of the ceramic raw material is 100 parts by mass.

The content of water is preferably 20 parts by mass to 60 parts by mass when the total mass of the ceramic raw material is 100 parts by mass.

when extruding the forming raw material, first, the forming raw material is preferably kneaded to form a kneaded material. The method for forming the kneaded material by kneading the forming raw material is not especially restricted, and, for example, the method using a kneader, a vacuum pugmill and the like can be included. Here, the kneaded material is also one aspect of the forming raw material.

Next, the kneaded material is preferably extruded to form the honeycomb formed body. In the extrusion, a die having a desirable whole shape, cell shape, partition wall thickness, cell density and the like is preferably used. The honeycomb formed body has porous partition walls defining and forming "a plurality of cells which are through channels of a fluid and extend from a first end face being an end face on an inflow side of the fluid to a second end face being an end face on an outflow side of the fluid". The honeycomb formed body formed to have a circumferential wall positioned in an outermost circumference is also a preferable aspect. The partition wall of the honeycomb formed body is an undried and unfired partition wall.

(2-1-2) Dried Honeycomb Body Forming Process:

The dried honeycomb body forming process is preferably the process to dry the obtained honeycomb formed body and form the dried honeycomb body. A drying condition is not especially limited, and a known condition can be used. It is preferable, for example, to dry for 0.5 hours to 5 hours at 80° C. to 120° C. The honeycomb formed body can be dried by use of an electric furnace, a gas furnace, a microwave heating furnace, a high frequency dielectric heating furnace and the like.

(2-1-3) Unfired Electrode Provided Honeycomb Body Forming Process:

In the unfired electrode provided honeycomb body forming process, slurry for electrode formation containing the ceramic raw material and water is preferably applied over the side surface of the dried honeycomb body. After that, the slurry for electrode formation is preferably dried to form an unfired electrode and form the unfired electrode provided honeycomb body.

In the unfired electrode provided honeycomb body, the unfired electrode having rectangular shape with a wider width, which extends to the cell extending direction in a band shape and expands also in a circumferential direction, is preferably formed to the dried honeycomb body. The circumferential direction is a direction along the side surface of the dried honeycomb body in a cross section perpendicular to the cell extending direction.

The slurry for electrode formation used in the unfired electrode provided honeycomb body forming process contains the ceramic raw material and water, and, besides these materials, preferably contains the surfactant, the pore former, water and the like.

As the ceramic raw material, it is preferable to use the ceramic raw material used when the honeycomb formed body is formed. For example, when the main components of the ceramic raw material used when the honeycomb formed body is formed are silicon carbide particles and metal silicon, the silicon carbide particles and metal silicon are preferably used also as the ceramic raw material of the slurry for electrode formation.

When silicon carbide particles (silicon carbide powder) and metal silicon particles (metal silicon powder) are used as the main components of the ceramic raw material, the mass of the metal silicon particles is preferably from 20 mass % to 50 mass % with respect to the total of the mass of the silicon carbide particles and the mass of the metal silicon particles. The average particle diameter of the silicon carbide particles is preferably from 10 μm to 100 μm, and further preferably from 15 μm to 75 μm. The average particle diameter of the metal silicon particles is preferably from 0.1 μm to 20 μm, and further preferably from 1 μm to 10 μm.

As the organic binder, methyl cellulose, glycerin, hydroxypropyl methyl cellulose and the like can be included. As the organic binder, one kind of organic binder may be used, and plural kinds of organic binder may be used. The content of the organic binder is preferably 0.1 parts by mass to 2 parts by mass when the total mass of the ceramic raw material is 100 parts by mass.

As the surfactant, ethylene glycol, dextrin and the like can be used. As the surfactant, one kind of surfactant may be used, and plural kinds of surfactant may be used. The content of the surfactant is preferably 5 parts by mass to 15 parts by mass when the total mass of the ceramic raw material is 100 parts by mass.

The pore former is not especially limited as long as pores are formed after firing, and, for example, graphite, starch, a foamable resin, a water absorbable resin, silica gel and the like can be included as the pore former. As the pore former, one kind of pore former may be used, and plural kinds of pore former may be used. The content of the pore former is preferably 0.5 parts by mass to 10 parts by mass when the total mass of the ceramic raw material is 100 parts by mass.

The content of water is preferably 25 parts by mass to 65 parts by mass when the total mass of the ceramic raw material is 100 parts by mass.

The method to apply the slurry for electrode formation over the side surface of the dried honeycomb body is not especially limited. For example, the method to apply by use of a brush or a printing technique can be employed.

Viscosity of the slurry for electrode formation is preferably equal to or less than 500 Pa·s, and further preferably 10 Pa·s to 200 Pa·s, at 20° C. The viscosity exceeding 500 Pa·s may make it difficult to apply the slurry for electrode formation over the side surface of the dried honeycomb body.

After application of the slurry for electrode formation to the dried honeycomb body, the slurry for electrode formation is preferably dried to form the unfired electrode (unfired electrode provided honeycomb body). A drying temperature is preferably 80° C. to 120° C. A drying time is preferably 0.1 hours to 5 hours.

(2-1-4) Honeycomb Structure Forming Process:

The honeycomb structure forming process is a process to form the honeycomb structure by firing the unfired electrode provided honeycomb body.

A firing condition can be appropriately determined based on the ceramic raw material used for manufacturing of the honeycomb formed body and the kind of the ceramic raw material used for the slurry for electrode formation. When silicon carbide is used as the main component of the ceramic raw material used for manufacturing of the honeycomb formed body and is used as the main component of the ceramic raw material used for the slurry for electrode formation, the firing condition is preferably determined as follows. That is, firing is preferably performed by heating for 0.5 hours to 5 hours at 2,300° C. to 2,700° C. under an inert atmosphere such as argon. When silicon carbide and metal silicon are used as the main components of the ceramic raw material used for manufacturing of the honeycomb formed body and is used as the main component of the ceramic raw material used for the slurry for electrode formation, the firing condition is preferably determined as follows. That is, firing is preferably performed by heating for 0.5 hours to 5 hours at 1,425° C. to 1,500° C. under an inert atmosphere such as argon. The method of firing is not especially limited, and firing can be performed by use of an electric furnace, a gas furnace and the like.

After firing, for improvement of durability, an oxidation treatment is preferably performed by leaving 1 hour to 10 hours at 1,200° C. to 1,350° C. under an air atmosphere.

After the unfired electrode provided honeycomb formed body is dried, before firing, calcination is preferably performed for reducing the binder and the like. The calcination is preferably performed for 0.5 hours to 20 hours at 400° C. to 500° C. under the air atmosphere.

The methods of calcination and firing are not especially limited, and firing and calcination can be performed by use of an electric furnace, a gas furnace and the like.

(2-2) Manufacturing of Reducing Agent Injection Device;

The reducing agent injection device is preferably manufactured as follows: a connector connecting the electrical wiring from outside is mounted on the outer cylinder, and then the honeycomb structure and the urea spraying device are housed in and secured to the outer cylinder.

The outer cylinder is preferably formed by forming a material, such as stainless steel, in a tubular shape. The honeycomb structure is preferably secured inside the outer cylinder by the insulation supporting portion. When there is a portion (space) where the insulation supporting portion between the honeycomb structure and the outer cylinder is not arranged, it is preferable to fill it with an insulating member.

As a urea spraying device, a urea spraying device of a solenoid type, an ultrasonic type, a piezoelectric actuator type, or an atomizer type is preferably used. As a urea spraying device of a solenoid type, an ultrasonic type, a piezoelectric actuator type, or an atomizer type, a known urea spraying device can be used.

(3) Method for Using Reducing Agent Injection Device:

The following describes a method for using the reducing agent injection device 100 (see FIG. 1) of the embodiment.

The reducing agent injection device 100, when a urea water solution a1 is supplied, can hydrolyze urea in the supplied urea water solution a1, and inject ammonia. The urea water solution is the raw material for generation of ammonia. Further, specifically, after energizing the honeycomb structure 1 to raise its temperature (heating) and supplying the urea water solution a1 to the urea spraying device 2, the urea water solution in mist form is preferably sprayed inside the urea spraying space 3 from the urea spraying device 2. When the urea water solution is sprayed from the urea spraying device 2, the urea water solution is preferably sprayed toward the first end face 13 of the honeycomb structure body 11. Then, the urea water solution in mist form (the urea water solution a2 sprayed from the urea spraying device 2) sprayed inside the urea spraying space 3 is heated by the honeycomb structure 1 and evaporates. Because the pressure inside the urea spraying space 3 increases due to evaporation of the urea water solution, urea and water enter inside the cell 16 of the honeycomb structure 1 from the first end face 13. The urea supplied inside the cell 16 is hydrolyzed by the temperature of the heated honeycomb structure 1, and the ammonia b is generated. Then, the reducing agent injection device 100 injects the ammonia b by injecting the generated ammonia b from the injection port 23 of the outer cylinder 4. The increased pressure inside the urea spraying space 3 accelerates the injection of ammonia from the injection port.

A supply amount of the urea water solution is preferably 1.0 to 2.0 in teams of an equivalence ratio with respect to the amount of nitrogen oxides contained in the exhaust gas. When the supply amount of the urea water solution is equal to or less than 1.0 in terms of the equivalence ratio, the amount of nitrogen oxides discharged without being purified may increase. When the supply amount of the urea water solution exceeds 2.0 in terms of the equivalence ratio, it may be more likely that the exhaust gas is discharged with ammonia mixed in the exhaust gas.

The urea water solution is preferably the urea water solution of 10 mass % to 40 mass %. When the value is lower than 10 mass %, because a large amount of urea water is required to be injected for $NO_x$ reduction, electric energy used in honeycomb heater may increase. When the value is higher than 40 mass %, there is a concern that urea solidifies in cold region. In the most preferable example, AdBlue (32.5 mass % urea water solution) widely distributed on the market is used.

The temperature of the honeycomb structure 1 is preferably equal to or more than 160° C., further preferably 160° C. to 600° C., and especially preferably 160° C. to 400° C. When the temperature is lower than 160° C., it may be difficult to hydrolyze urea. When the temperature is higher than 600° C., ammonia is burnt and ammonia may not be supplied to the exhaust pipe. It is preferable to set the temperature of the honeycomb structure 1 equal to or more than 360° C. in that a sulfur compound, such as ammonium hydrogen sulfate, ammonium sulfate and the like, that deposits in the reducing agent injection device 100 can be removed.

The maximum voltage to be applied to the honeycomb structure 1 is preferably 12 V to 200 V, further preferably 12 V to 100 V, and especially preferably 12 V to 48 V. When the maximum voltage is lower than 12 V, it may be difficult to raise the temperature of the honeycomb structure 1. The maximum voltage higher than 200 V requires a more expensive voltage booster and is not preferable.

A spraying amount of the urea water solution and the temperature (applied voltage) of the honeycomb structure 1 are preferably controlled (adjusted to proper value) by the electronic control device 31 (see FIG. 2). Preferably, temperature of the honeycomb structure is calculated from a resistance value of the honeycomb structure and is controlled such that the calculated temperature becomes desired temperature.

Figure 6:
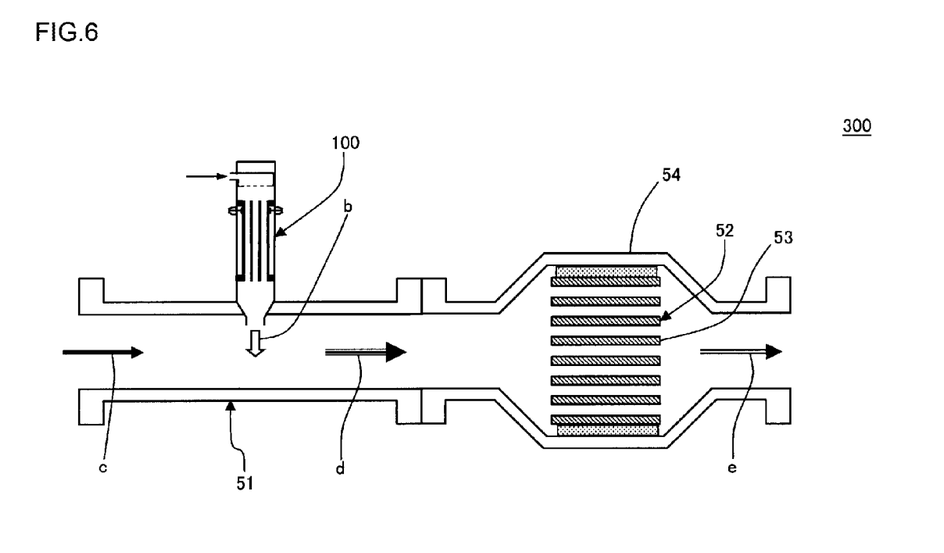
FIG. 6 is a schematic diagram showing a cross section of one embodiment of an exhaust gas treatment device of the present invention.

(4) Exhaust Gas Treatment Device:

One embodiment (an exhaust gas treatment device 300) of the exhaust gas treatment device of the present invention includes an exhaust pipe 51, the reducing agent injection device 100, an SCR catalyst 52 arranged on "the downstream side of the exhaust pipe 51 with respect to the position where ammonia is injected." The reducing agent injection device 100 injects ammonia inside the exhaust pipe 51. The exhaust pipe 51 is the pipe that flows "an exhaust gas c containing $NO_x$."

The exhaust pipe 51 is a pipe passing the exhaust gas (the exhaust gas c containing $NO_x$) discharged from various kinds of engines, and the exhaust gas and ammonia are mixed in the exhaust pipe 51. The size of the exhaust pipe 51 is not especially limited and can be appropriately determined in accordance with an exhaust system of an engine and the like where the exhaust gas treatment device 300 of the embodiment is mounted. Though the length in the exhaust gas flowing direction in the exhaust pipe 51 is not especially limited, it is preferable for the length to make a distance between the reducing agent injection device 100 and the SCR catalyst 52 an appropriate distance. It is preferable for the length in the exhaust gas flowing direction of the exhaust pipe 51 to be a length which allows the exhaust pipe 51 to be mounted in a narrow space of the automobile and the like. The distance between the reducing agent injection device 100 and the SCR catalyst 52 can be shorter than "a conventional injector (urea injection device) where droplets of urea are directly added to an exhaust pipe" because gaseous ammonia is supplied to realize better mixing with the exhaust gas.

Though the material of the exhaust pipe 51 is not especially limited, a material where corrosion by the exhaust gas is less likely to occur is preferable. As the material of the exhaust pipe 51, for example, stainless steel and the like are preferable.

The reducing agent injection device 100 is a reducing agent injection device of the present invention. The reducing agent injection device 100 is mounted to the exhaust pipe 51 and injects ammonia inside the exhaust pipe 51. By injection of ammonia inside the exhaust pipe 51 from the reducing agent injection device 100, a mixed gas d of ammonia and the exhaust gas is generated inside the exhaust pipe 51.

The exhaust gas treatment device 300 of the embodiment includes the SCR catalyst 52 arranged on "the downstream side of the exhaust pipe 51 with respect to the position where ammonia is injected." The SCR catalyst is preferably arranged on the downstream side of the exhaust pipe 51 in a state of catalyzer (SCR catalyst loaded onto the ceramic honeycomb structure).

As the SCR catalyst, specifically, a vanadium-based catalyst, a zeolite-based catalyst and the like can be included.

When the SCR catalyst 52 is used as a catalyzer 53 loaded onto the honeycomb structure, this catalyzer 53 is housed in a storing container 54, and this storing container 54 is preferably installed on the downstream side of the exhaust pipe 51.

The honeycomb structure loading the SCR catalyst is not especially limited, and a known honeycomb structure as "a ceramic honeycomb structure loading an SCR catalyst" can be used.

In an upstream side of the exhaust pipe 51, a filter for trapping particulate matter in the exhaust gas is preferably arranged. As the filter for trapping a particulate matter, for example, a honeycomb-shaped ceramic diesel particulate filter (DPF) is included. In the upstream side of the exhaust pipe 51, an oxidation catalyst for removing hydrocarbon and carbon monoxide in the exhaust gas is preferably arranged. The oxidation catalyst is preferably in a state of being loaded onto the ceramic honeycomb structure. As the oxidation catalyst, noble metals, such as platinum (Pt), palladium (Pd), rhodium (Rh) and the like are suitably used.

On the downstream side of the SCR catalyst, an ammonia removal catalyst (oxidation catalyst) for removing ammonia is preferably arranged. This prevents ammonia from being discharged outside when extra ammonia not used for removal of $NO_x$ in the exhaust gas flows on the downstream side. As the oxidation catalyst, noble metals, such as platinum (Pt), palladium (Pd), rhodium (Rh) and the like are suitably used.

(5) Exhaust Gas Treatment Method:

One embodiment of an exhaust gas treatment method of the present invention is a method that flows the exhaust gas c in the exhaust pipe 51, injects the ammonia b to the exhaust gas c, and performs a reduction treatment of the mixed gas by the SCR catalyst, by using the one embodiment (the exhaust gas treatment device 300) of the present invention shown in FIG. 6. This allows an exhaust gas e after $NO_x$ removal to be obtained. The above-described exhaust gas c contains $NO_x$. The above-described mixed gas is "the exhaust gas with ammonia being mixed," and is the mixed gas d of ammonia and the exhaust gas. The ammonia b is injected by the reducing agent injection device 100.

Temperature of the honeycomb structure constituting the reducing agent injection device 100 is preferably equal to or more than 160° C., further preferably 160° C. to 600° C., and especially preferably 160° C. to 400° C. When the temperature is lower than 160° C., urea may be less likely to be hydrolyzed. When the temperature is higher than 600° C., ammonia is burnt and may not be supplied to the exhaust pipe. Under the temperature of the honeycomb structure equal to or more than 360° C., a reducing agent injection device purification operation that removes the sulfur compound adhered to the reducing agent injection device is preferably performed intermittently.

The voltage to be applied to the honeycomb structure 1 is preferably 12 V to 200 V, further preferably 12 V to 100 V, and especially preferably 12 V to 48 V. When the voltage is lower than 12 V, it may be difficult to raise the temperature of the honeycomb structure 1. The voltage higher than 200 V requires a more expensive voltage booster and is not preferable.

The spraying amount of the urea water solution and the temperature (applied voltage) of the honeycomb structure 1 are preferably controlled by the electronic control device 31 (see FIG. 2). Preferably, temperature of the honeycomb structure is calculated from the resistance value of the honeycomb structure and is controlled such that the calculated temperature becomes desired temperature.

An injection amount of ammonia injected from the reducing agent injection device 100 is preferably 1.0 to 2.0 in terms of the equivalence ratio with respect to the amount of nitrogen oxides contained in the exhaust gas. When the injection amount of ammonia is equal to or less than 1.0 in terms of the equivalence ratio, the amount of nitrogen oxides discharged without being purified may increase. When the injection amount of ammonia exceeds 2.0 in terms of the equivalence ratio, it may be more likely that the exhaust gas is discharged with ammonia mixed in the exhaust gas.

EXAMPLES

The following describes the present invention more specifically with example, but the present invention is not limited to these examples.

Example 1

A reducing agent injection device was formed as shown in FIG. 1. The reducing agent injection device is specifically described as follows.

The silicon carbide (SiC) powder and metal silicon (Si) powder were mixed at a mass ratio of 70:30 to prepare ceramic raw material. Then, hydroxypropyl methyl cellulose as a binder and a water absorbable resin as a pore former were added to this ceramic raw material, and water was added together to prepare a forming raw material. Then, the forming raw material was kneaded by a vacuum pugmill to form a round pillar-shaped kneaded material. The content of the binder was 7 parts by mass when the ceramic raw material was 100 parts by mass. The content of the pore former was 3 parts by mass when the ceramic raw material was 100 parts by mass. The content of water was 42 parts by mass when the ceramic raw material was 100 parts by mass. The average particle diameter of the silicon carbide powder was 20 µm, and the average particle diameter of the metal silicon powder was 6 µm. The average particle diameter of the pore former was 20 µm. The average particle diameters of the silicon carbide, the metal silicon, and the pore former were the values measured by the laser diffraction method.

The obtained round pillar-shaped kneaded material was formed by an extruder, and a square pillar-shaped (a cross section perpendicular to the cell extending direction is square-pillar shape) honeycomb formed body was obtained. After the obtained honeycomb formed body was dried by high frequency dielectric heating, the obtained honeycomb formed body was dried for 2 hours at 120° C. by use of a hot-air drying machine, and then both end faces were cut as much as predetermined amounts.

Next, the silicon carbide (SiC) powder and metal silicon (Si) powder were mixed at the mass ratio of 60:40 to prepare the ceramic raw material for the electrode member. Then, hydroxypropyl methyl cellulose as the binder, glycerin as a moisturizing agent, and a surfactant as a dispersing agent were add to the ceramic raw material for the electrode member, and water was added together to mix. The mixture was kneaded to prepare an electrode member forming raw material. The content of the binder was 0.5 parts by mass when the ceramic raw material for the electrode member was 100 parts by mass. The content of glycerin was 10 parts by mass when the ceramic raw material for the electrode member was 100 parts by mass. The content of the surfactant was 0.3 parts by mass when the ceramic raw material for the electrode member was 100 parts by mass. The content of water was 42 parts by mass when the ceramic raw material for the electrode member was 100 parts by mass. The average particle diameter of the silicon carbide powder was 52 µm, and the average particle diameter of the metal silicon powder was 6 µm. The average particle diameters of the silicon carbide and metal silicon were the values measured by the laser diffraction method. Kneading was performed by a vertical stirrer.

Next, the electrode member forming raw material were applied in a band shape over two parallel surfaces in the side surfaces of the dried honeycomb formed body. The electrode member forming raw material was applied in a band shape over one side surface among "the side surfaces (four side surfaces) having four planes" of the dried honeycomb formed body, and was also applied in a band shape over one side surface parallel to this "applied side surface." The shape (circumference shape) of the electrode member forming raw material applied over the side surface of the honeycomb formed body was a rectangular shape.

Next, the electrode member forming raw material applied to the honeycomb formed body was dried. The drying condition was 70° C.

Next, by using the same material as an electrode forming material, an electrode terminal projecting portion forming member was obtained. The shape of the electrode terminal projecting portion forming member was a round pillar body with "8 mm (φ: diameter)×10 mm (length)." Two electrode terminal projecting portion forming members were formed.

Next, each of two electrode terminal projecting portion forming members was laminated to the respective portions, where the electrode member forming raw material was applied, of two places of the honeycomb formed body, respectively. The electrode terminal projecting portion forming member was laminated to the portion where the electrode member forming raw material of the honeycomb formed body was applied, by using the electrode member forming raw material. Afterwards, "the honeycomb formed body, where the electrode member forming raw material was applied and the electrode terminal projecting portion forming member was laminated," was degreased, fired, and further underwent oxidation treatment to obtain the honeycomb structure. The degreasing condition was 3 hours at 550° C. The firing condition was 2 hours at 1,450° C. under the argon atmosphere. The oxidation treatment condition was 1 hour at 1,300° C.

The thickness of the partition walls of the obtained honeycomb structure was 0.152 mm, and a cell pitch was 1.11 mm. The surface area per unit volume of the honeycomb structure body was 31.1 $cm^2/cm^3$. The shape of the honeycomb structure was round pillar shape with a square bottom surface. One side of the bottom surface of the honeycomb structure was 30 mm. The length in the cell extending direction of the honeycomb structure was 45 mm. The electrical resistivity of the electrode member was 0.1 Ωcm, and the electrical resistivity of the honeycomb structure body was 1.4 Ωcm.

An outer cylinder was formed with a stainless steel. The outer cylinder was formed in a tubular shape with an inlet side end portion as one end portion and an outlet side end portion as the other end portion. An injection port, which is an open end to inject an ammonia gas, was formed at a distal end of the outlet side end portion of the outer cylinder. In the inlet side end portion of the outer cylinder, a hole for passing a pipe introducing the urea water solution was formed.

In the outer circumference of the outer cylinder, two connectors for the electrical wiring were mounted.

The honeycomb structure was inserted inside the outer cylinder and secured by the insulation supporting portion. Then, the electrode terminal projecting portions of the honeycomb structure were connected to the connectors in the outer cylinder by the electrical wiring. A urea spraying device of a solenoid type was mounted inside the inlet side end portion of the outer cylinder to obtain the reducing agent injection device. The material of the insulation supporting portion was alumina. An angle between a spraying direction of the urea spraying device and a cell direction of the honeycomb structure was 0°.

An SCR catalyst was loaded onto the honeycomb structure containing cordierite as a main component to form a catalyzer. As the SCR catalyst, a catalyst where a noble metal was loaded onto zeolite was used. The volume of the catalyzer was 4.0 liters. The thickness of the partition wall of the catalyzer was 0.15 mm, and the cell pitch of the catalyzer was 1.27 mm.

By mounting the obtained reducing agent injection device to an exhaust pipe, inserting the catalyzer in a storing container, and connecting the exhaust pipe to the storing container, the exhaust gas treatment device as shown in FIG. 6 was obtained.

By using the obtained exhaust gas treatment device, following a method described below, "an exhaust gas treatment test" was performed, and a purification efficiency of $NO_x$ was measured. The result is shown in Table 1. When performing "the exhaust gas treatment test," a urea water solution inlet of the reducing agent injection device was connected to a urea water solution reservoir with a pipe so that the urea water solution was supplied to the reducing agent injection device. The wiring from an electronic control device was connected to the connectors of the reducing agent injection device and the urea spraying device.

(Exhaust Gas Treatment Test)

An exhaust gas of a diesel engine with a displacement of 3.0 liters is introduced to the exhaust pipe of the exhaust gas treatment device to perform treatment of the exhaust gas by the exhaust gas treatment device. Then, an $NO_x$ concentration in the gas discharged from the catalyzer where the SCR catalyst is loaded is measured. The $NO_x$ concentration of the exhaust gas introduced in the exhaust pipe of the exhaust gas treatment device is 400 ppm. The amount of the urea water solution supplied to the reducing agent injection device is adjusted so that an NOx amount (mole) in the exhaust gas and an amount (mole) of the injected ammonia become the same. When the test is performed while changing temperature of exhaust gas as shown in Table 1, the $NO_x$ concentration in the gas discharged from the catalyzer at the respective temperature is measured. The $NO_x$ concentration in the discharged gas is a concentration when this $NO_x$ concentration becomes constant. Then, $NO_x$ purification efficiency is obtained from the $NO_x$ concentration in the exhaust gas introduced to the exhaust pipe of the exhaust gas treatment device and the $NO_x$ concentration in the gas discharged from the catalyzer. At the time of the measurement, the temperature of 360° C. is maintained by applying a voltage of maximum 48 V to the honeycomb structure.

TABLE 1

| Temperature of Exhaust Gas(° C.) | $NO_x$ Purification Efficiency(%) | |
| --- | --- | --- |
| | Example 1 | Comparative Example 1 |
| 140 | 26 | 5 |
| 160 | 49 | 21 |
| 180 | 78 | 38 |
| 200 | 89 | 55 |
| 250 | 93 | 85 |
| 300 | 95 | 91 |

Comparative Example 1

An exhaust gas treatment device was formed similarly to Example 1 except that the honeycomb structure was not included in the reducing agent injection device. Similarly to the case of Example 1, "an exhaust gas treatment test" was performed. The result is shown in Table 1.

From Table 1, it is possible to confirm that the exhaust gas purifying device of Example 1 exhibits higher $NO_x$ purification efficiencies compared to the exhaust gas purifying device of Comparative Example 1. Especially, in a lower temperature region of the exhaust gas, the differences are larger. The higher purification efficiency requires, in addition to ensuring activity of the SCR catalyst, acceleration of hydrolysis from urea to ammonia and introduction of ammonia as a reducing agent are necessary. However, in the exhaust gas purifying device of Comparative Example 1, because the hydrolysis to ammonia is not accelerated in the lower temperature and the reducing agent becomes insufficient, the $NO_x$ purification efficiency becomes lower. In contrast to this, in the exhaust gas purifying device of Example 1, because urea spraying space, where the urea water solution is injected, is heated by the honeycomb structure in the reducing agent injection device, the hydrolysis of urea is accelerated, and ammonia is introduced in the exhaust pipe, the $NO_x$ purification efficiency is improved.

The exhaust gas purifying device of Example 1 was able to generate ammonia from the urea solution and inject the ammonia with less energy.

INDUSTRIAL APPLICABILITY

The reducing agent injection device of the present invention can be suitably used to purify nitrogen oxides ($NO_x$) in an exhaust gas discharged from various kinds of engines and the like.

DESCRIPTION OF REFERENCE NUMERALS

1: honeycomb structure
2: urea spraying device
3: urea spraying space
4: outer cylinder
5: insulation supporting portion
6: connector
7: electrical wiring
8: urea water solution inlet
11: honeycomb structure body
12: electrode member
13: first end face
14: second end face
15: partition wall
16: cell
17: outer circumferential wall
18: electrode terminal projecting portion
21: inlet side end portion (of outer cylinder)
22: outlet side end portion (of outer cylinder)
23: injection port
31: electronic control device
32: urea water solution reservoir
33: pipe
41: honeycomb structure
42: honeycomb structure body
43: plugging portion
51: exhaust pipe
52: SCR catalyst
53: catalyzer
54: storing container
100, 200: reducing agent injection device
300: exhaust gas treatment device
a1: urea water solution
a2: urea water solution sprayed from urea spraying device
b: ammonia
c: exhaust gas
d: mixed gas of ammonia and exhaust gas
e: exhaust gas after removal of $NO_x$
θ: angle
α: spraying direction
β: cell direction

The invention claimed is:
1. A reducing agent injection device, comprising:
a honeycomb structure that has an electrically heated honeycomb structure body with a pillar shape having partition walls defining and forming a plurality of cells which are through channels of a fluid and extend from a first end face being an end face on an inflow side of the fluid to a second end face being an end face on an outflow side of the fluid, and that has a pair of electrode members arranged in a side surface of the honeycomb structure body; and
a urea spraying device that sprays a urea water solution in mist form, wherein each of the pair of electrode members is formed in a band shape extending to a cell extending direction of the honeycomb structure body, and one electrode member of the pair of electrode members is arranged on an opposite side of the other electrode member of the pair of electrode members with respect to a center of the honeycomb structure body sandwiched by the pair of electrode members, in a cross section perpendicular to the cell extending direction, the urea water solution sprayed from the urea spraying device is supplied inside the cells from the first end face of the honeycomb structure body, and urea in the urea water solution supplied in the cells is heated and hydrolyzed inside the electrically heated honeycomb structure body to generate ammonia, and the ammonia is discharged outside the honeycomb structure body from the second end face and is injected outside, and a surface area per unit volume of the honeycomb structure body is equal to or more than 5 $cm^2/cm^3$.

2. The reducing agent injection device according to claim 1, wherein a urea spraying space is formed between the first end face of the honeycomb structure body and the urea spraying device.

3. The reducing agent injection device according to claim 2, wherein an electrical resistivity of the honeycomb structure body is 0.01 Ωcm to 500 Ωcm.

4. The reducing agent injection device according to claim 3, wherein the honeycomb structure body contains a silicon-silicon carbide composite material or silicon carbide as a main component.

5. The reducing agent injection device according to claim 4, wherein a urea hydrolysis catalyst is loaded onto the honeycomb structure.

6. The reducing agent injection device according to claim 5, wherein the urea water solution is sprayed toward the first end face of the honeycomb structure from the urea spraying device, and an angle between a spraying direction of the urea water solution from the urea spraying device and a direction parallel to the cell extending direction of the honeycomb structure body and heading to the first end face of the honeycomb structure from the urea spraying device is from 5° to 60°.

7. The reducing agent injection device according to claim 1, wherein an electrical resistivity of the honeycomb structure body is 0.01 Ωcm to 500 Ωcm.

8. The reducing agent injection device according to claim 1, wherein the honeycomb structure body contains a silicon-silicon carbide composite material or silicon carbide as a main component.

9. The reducing agent injection device according to claim 1, wherein a urea hydrolysis catalyst is loaded onto the honeycomb structure.

10. The reducing agent injection device according to claim 1, wherein the urea water solution is sprayed toward the first end face of the honeycomb structure body from the urea spraying device and an angle between a spraying direction of the urea water solution from the urea spraying device and a direction parallel to the cell extending direction of the honeycomb structure body and heading to the first end face of the honeycomb structure body from the urea spraying device is from 5° to 60°.

11. The reducing agent injection device according to claim 1, wherein the honeycomb structure body has a plugging portion at an end portion of the first end face side in a part of the cells thereof.

12. The reducing agent injection device according to claim 1, wherein the urea spraying is a solenoid type, a piezoelectric actuator type, an ultrasonic type, or an atomizer type.

13. An exhaust gas treatment device, comprising:
an exhaust pipe that flows an exhaust gas containing $NO_R$;
the reducing agent injection device according to claim 1 that injects ammonia inside the exhaust pipe; and
an SCR catalyst arranged on a downstream side of the exhaust pipe with respect to a position where the ammonia is injected.

14. An exhaust gas treatment method comprising flowing exhaust gas containing NO in an exhaust pipe, injecting ammonia inside the exhaust pipe to the exhaust gas by the reducing agent injection device according to claim 1, and performing a reduction treatment to the exhaust gas mixed with the ammonia by an SCR catalyst arranged on a downstream side of the exhaust pipe with respect to a position where the ammonia is injected.

15. The exhaust gas treatment method according to claim 14, wherein a temperature of the honeycomb structure is equal to or more than 160° C.

16. The exhaust gas treatment method according to claim 14, comprising intermittently performing, under a temperature of the honeycomb structure equal to or more than 360° C., a reducing agent injection device cleaning operation which removes a sulfur compound adhered to the reducing agent injection device.

17. The exhaust gas treatment method according to claim 14, calculating a temperature of the honeycomb structure body from a resistance value of the honeycomb structure body, and controlling the temperature of the honeycomb structure body such that the calculated temperature becomes a desired temperature.

* * * * *

UNITED STATES PATENT AND TRADEMARK OFFICE
CERTIFICATE OF CORRECTION

PATENT NO. : 9,759,106 B2  
APPLICATION NO. : 14/856659  
DATED : September 12, 2017  
INVENTOR(S) : Yoshiyuki Kasai, Kazumi Mase and Katsumi Saiki It is certified that error appears in the above-identified patent and that said Letters Patent is hereby corrected as shown below:

On the Title Page

Foreign Patent Documents, Page 2, Right Column:
Please change: "JP EP 2540382 A1" to -- EP EP 2540382 A1 --

Signed and Sealed this
Fifth Day of December, 2017

Joseph Matal
*Performing the Functions and Duties of the*
*Under Secretary of Commerce for Intellectual Property and*
*Director of the United States Patent and Trademark Office*